(12) United States Patent
Nelson

(10) Patent No.: US 8,590,834 B1
(45) Date of Patent: Nov. 26, 2013

(54) AIRCRAFT CONTROL SURFACE ACTUATION SYSTEM WITH HELICAL ACTUATION PATH

(75) Inventor: Paul E. Nelson, University Place, WA (US)

(73) Assignee: The Boeing Company, Chicago, IL (US)

( * ) Notice: Subject to any disclaimer, the term of this patent is extended or adjusted under 35 U.S.C. 154(b) by 63 days.

(21) Appl. No.: 13/295,187

(22) Filed: Nov. 14, 2011

(51) Int. Cl.
*B64C 3/50* (2006.01)
(52) U.S. Cl.
USPC ......................... 244/99.3; 244/215
(58) Field of Classification Search
USPC .............. 244/99.2–99.4, 211–215, 218
See application file for complete search history.

(56) References Cited

U.S. PATENT DOCUMENTS

| | | | |
|---|---|---|---|
| 3,630,328 A * | 12/1971 | Nelson ..................... 192/223 |
| 3,667,311 A * | 6/1972 | Wysong .................. 74/424.75 |
| 3,731,546 A * | 5/1973 | MacDonald ................. 74/63 |
| 3,776,491 A * | 12/1973 | Oulton ....................... 244/213 |
| 4,180,222 A | 12/1979 | Thornburg |
| 4,181,277 A * | 1/1980 | Gerhardt .................... 244/218 |
| 4,995,575 A * | 2/1991 | Stephenson ............... 244/216 |
| 5,743,490 A * | 4/1998 | Gillingham et al. ....... 244/99.9 |
| 6,244,542 B1 * | 6/2001 | Young et al. .............. 244/213 |
| 6,467,733 B1 * | 10/2002 | Young et al. .............. 244/215 |
| 6,851,648 B2 * | 2/2005 | Perni et al. ................ 244/99.3 |
| 7,680,565 B2 * | 3/2010 | Balasu et al. ................. 701/3 |
| 7,690,597 B2 | 4/2010 | Cavalier et al. |
| 2009/0134281 A1* | 5/2009 | Engelbrecht et al. ...... 244/215 |

* cited by examiner

*Primary Examiner* — Tien Dinh
(74) *Attorney, Agent, or Firm* — Walters & Wasylyna LLC

(57) ABSTRACT

An aircraft control surface actuation system including a wing member and an aircraft control surface hingedly connected to the wing member along a pivot axis, wherein the aircraft control surface is configured to axially move along the pivot axis when the aircraft control surface pivots relative to the wing member about the pivot axis.

14 Claims, 6 Drawing Sheets

AIRCRAFT CONTROL SURFACE ACTUATION SYSTEM WITH HELICAL ACTUATION PATH

FIELD

The present disclosure generally relates to aircraft control surfaces and, more particularly, to apparatus and methods for actuating aircraft control surfaces.

BACKGROUND

Aircraft commonly employ various aircraft control surfaces, such as ailerons, elevators, rudders and flaperons, which may be actuated to control the pitch, roll and yaw of the aircraft. As one example, ailerons are mounted on the wings of the aircraft and are actuated to either an up or down configuration to control lift at the respective wing. As another example, elevators are mounted on a horizontal stabilizer of the aircraft and are actuated to either an up or down configuration to control the pitch of the aircraft.

Aircraft control surfaces are actuated by a power control unit ("PCU"). For example, an aileron typically includes a bell crank that may be pushed or pulled by the PCU to effect the desired up and down motion of the aileron. For reasons of redundancy, there are typically two or three PCU's for each control surface, any of which must be capable of actuating the entire control surface. Due to the size of the PCU, conventional ailerons are cantilevered some distance away from a rear spar of the wing to allow space for the PCU. The PCU is typically installed lengthwise between the rear spar and the aileron. Therefore, use of a conventional PCU consumes limited space and adds weight.

Furthermore, due to its size and shape, the bell crank often does not fit within the aero envelope. Therefore, the bell crank must be covered with an aero blister, which also adds weight and increases excrescence drag.

High performance wings are thin. However, since bell crank-actuated ailerons are typically actuated proximate the center of the aileron, while the air loads are distributed along the entire length of the aileron, the aileron must be sufficiently stiff to resist the air loads along its entire length. The structure required to provide such stiffness significantly increases weight, particularly in thin, high performance wings.

Rotary power control units, also known as power hinges, have also been utilized to actuate aircraft control surfaces. However, rotary power control units are generally more complicated than bell crank assemblies, and do not provide distributed actuation along the length of the aircraft control surface.

Accordingly, those skilled in the art continue with research and development efforts in the field of aircraft control surface actuation.

SUMMARY

In one aspect, the disclosed aircraft control surface actuation system may include a wing member and an aircraft control surface hingedly connected to the wing member along a pivot axis, wherein the aircraft control surface is configured to axially move along the pivot axis when the aircraft control surface pivots relative to the wing member about the pivot axis.

In another aspect, the disclosed aircraft control surface actuation system may include a ball screw assembly including a ball nut in threaded engagement with a ball screw, the ball screw defining a pivot axis, a wing member connected to either the ball nut or the ball screw, and an aircraft control surface connected to the other of the ball nut and the ball screw.

In yet another aspect, disclosed is a method for actuating an aircraft control surface relative to a wing member. The method may include the steps of (1) connecting the aircraft control surface to the wing member along a pivot axis such that the aircraft control surface pivots relative to the wing member about the pivot axis when the aircraft control surface is axially moved along the pivot axis and (2) applying an axial force to the aircraft control surface to cause the axial movement of the aircraft control surface.

The features, functions and advantages that have been discussed can be achieved independently in various embodiments or may be combined in yet other embodiments, further details of which can be seen with reference to the following description and drawings.

DETAILED DESCRIPTION

Figure 1:
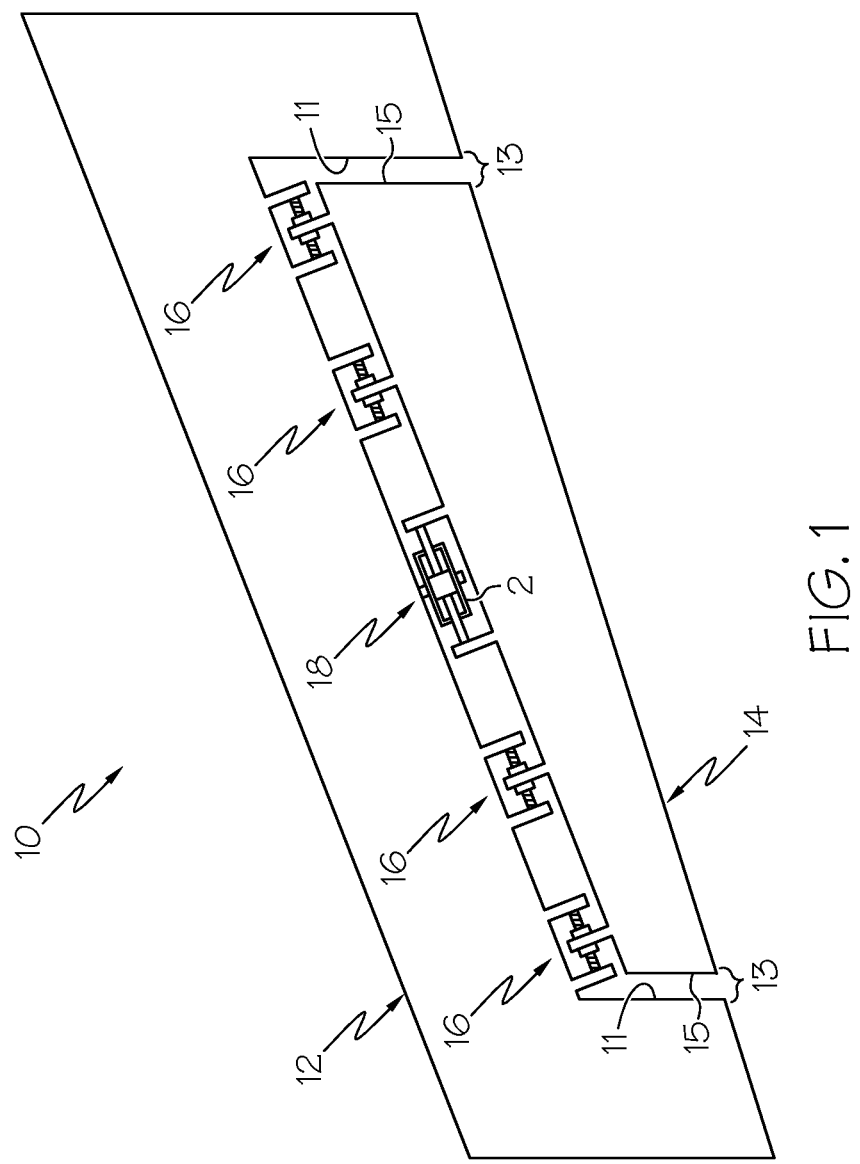
FIG. 1 is a top plan view of one aspect of the disclosed aircraft control surface actuation system.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Referring to FIG. 1, one aspect of the disclosed aircraft control surface actuation system, generally designated 10, may include a wing member 12, an aircraft control surface 14 and one or more ball screw assemblies 16. A power control unit ("PCU") 18 may be provided to pivot the aircraft control surface 14 relative to the wing member 12, such as by supplying an axial force to the ball screw assembly 16 (or directly to the aircraft control surface 14). While only one PCU 18 is shown in the drawings, in practice, there may be multiple, redundant PCUs.

The wing member 12 may be any portion of an aircraft having an aircraft control surface 14 hingedly connected thereto. As one example, the wing member 12 may be a wing or other structure that generates lift. As another example, the wing member 12 may be an empennage (e.g., a vertical stabilizing surface and/or a horizontal stabilizing surface) or other structure that provides stability to the aircraft.

The aircraft control surface 14 may be any control surface capable of being actuated in accordance with the disclosed aircraft control surface actuation system 10. Examples of suitable aircraft control surfaces include, but are not limited to, flaps, ailerons, elevators, elevons and flaperons.

Figure 2:
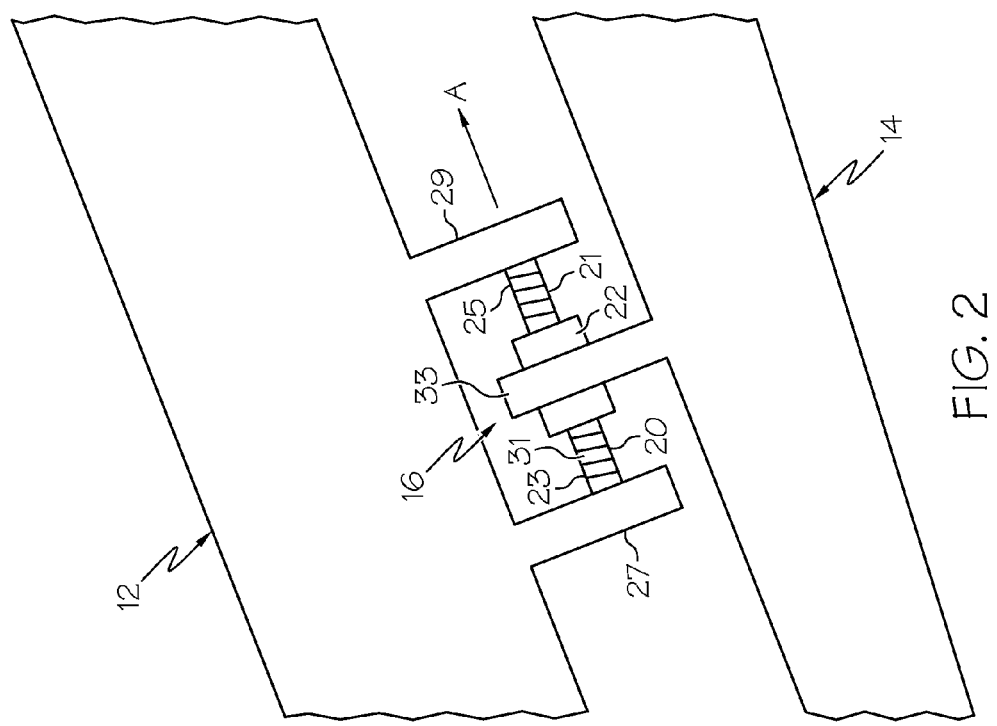
FIG. 2 is a top plan view of a ball screw assembly of the aircraft control surface actuation system of FIG. 1.
Figure 3:
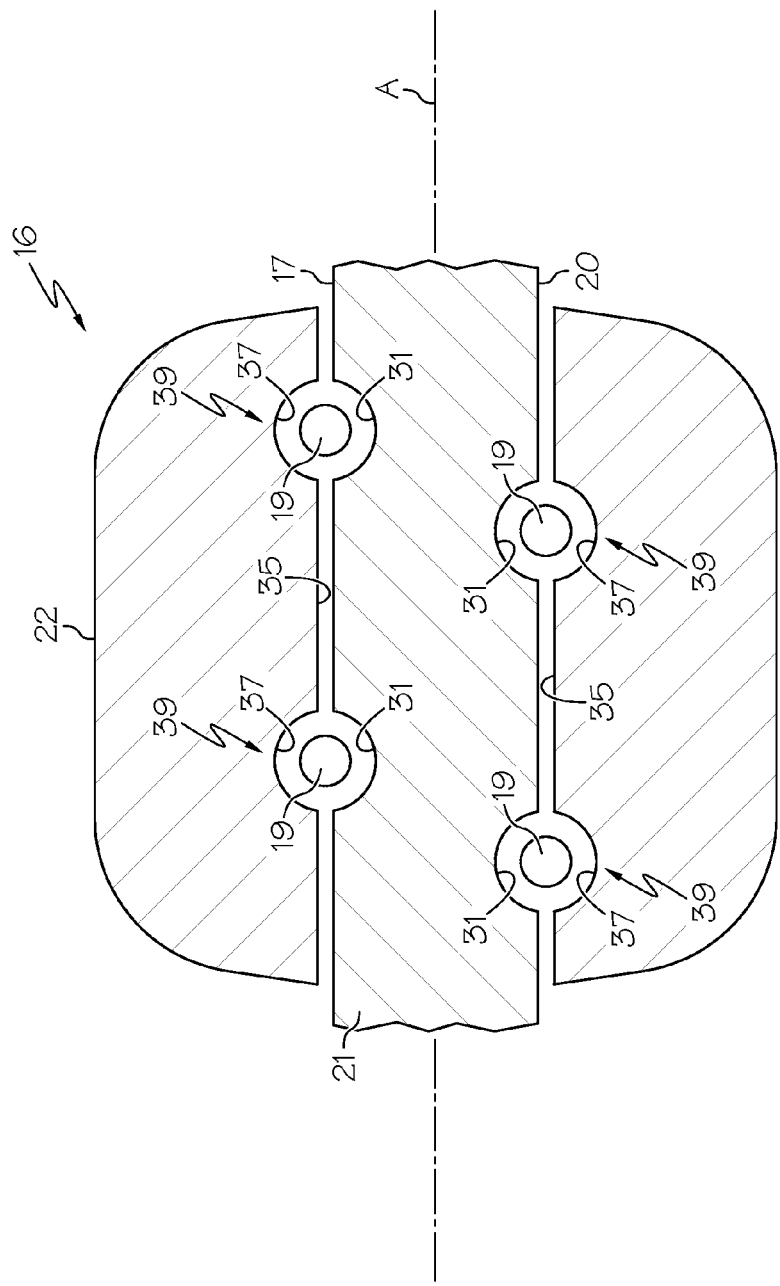
FIG. 3 is a side plan view, in section, of the ball screw assembly of FIG. 2.

Referring to FIGS. 2 and 3, the ball screw assembly 16 of the disclosed aircraft control surface actuation system 10 may include a ball screw 20, a ball nut 22 and one or more bearings 19, such as ball bearings, positioned between the ball nut 22 and the ball screw 20. Therefore, when the wing member 12 is connected to the ball screw 20 (or the ball nut 22) and the aircraft control surface is connected to the ball nut 22 (or the ball screw 20), the ball screw assembly 16 may act as a hinge between the aircraft control surface 14 and the wing member 12.

Optionally, the ball screw 20 and ball nut 22 may be shielded from the environment by an enclosure (not shown). The enclosure may employ seals, bellows, telescoping tubes or other features known in the art.

As shown in FIG. 2, the ball nut 22 may be in threaded engagement with the ball screw 20 such that the ball nut 22 rotates about the axis A of the ball screw 20 as the ball nut 22 axially moves along the ball screw 20. Therefore, the axial movement of the ball nut 22 relative to the ball screw 20 may be translated into the helical rotation (torque) required to actuate the aircraft control surface 14 relative to the wing member 12.

The ball screw 20 may include an elongated shaft 21 having a first end 23 and a second end 25. The first end 23 of the shaft 21 may be connected to a first support 27 extending from the wing member 12 and the second end 25 may be connected to a second support 29 extending from the wing member 12. Therefore, the ball screw 20 may be secured in an axial configuration between the first and second supports 27, 29.

The outer surface 17 of the ball screw 20 may define a helical groove 31. The helical groove 31 may extend from proximate (i.e., at or near) the first end 23 of the shaft 21 to proximate the second end 25 of the shaft 21.

The ball nut 22 may be in threaded engagement with the ball screw 20, and may be positioned between the first end 23 and the second end 25 of the shaft 21. The ball nut 22 may be connected to a support 33 extending from the aircraft control surface 14.

In FIG. 3, the inner surface 35 of the ball nut 22 may define a helical groove 37. Therefore, the helical groove 37 of the ball nut 22 and the helical groove 31 of the ball screw 20 may cooperate to define a helical ball race 39 between the ball screw 20 and the ball nut 22.

The bearings 19 may be received in the helical ball race 39. The bearings 19 may flow in a continuous path through the helical ball race 39 to reduce friction between the ball nut 22 and the ball screw, thereby minimizing the force required to translate an axial force applied to the ball nut 22 into the helical rotation (torque) required to actuate the aircraft control surface 14 relative to the wing member 12. In one optional expression, the ball screw assembly 16 may include an external ball return system to accommodate the bearings 19 moving through the helical ball race 39. In another optional expression, the ball screw assembly 16 may include an internal ball return system.

Thus, the aircraft control surface 14 may be actuated to an up or down configuration relative to the wing member 12 by axially urging the ball nut 22 of the ball screw assembly 16 along the ball screw 20 (i.e., either toward the first end 23 of the shaft 21 of the ball screw 20 or toward the second end 25 of the shaft 21 of the ball screw 20).

At this point, those skilled in the art will appreciate that, due to the threaded engagement of the ball screw assembly 16, there may be axial motion as the aircraft control surface 14 rotates to the actuated (e.g., up or down) configuration (i.e., the aircraft control surface 14 may travel in a helical path during actuation). Therefore, each ball screw assembly 16 may serve at least two functions: (1) the ball screw assembly 16 may act as a hinge and (2) the ball screw assembly 16 may impart an actuation torque to the aircraft control surface 14.

Furthermore, due to the axial motion of the aircraft control surface 14 as it rotates relative to the wing member 12, the cut-out edges 11 of the wing member 12 may interfere with the movement of the aircraft control surface 14. Therefore, gaps 13 may be provided between the cut-out edges 11 of the wing member 12 and the edges 15 of the aircraft control surface 14 to accommodate the axial translation of the aircraft control surface 14 relative to the wing member 12.

While the foregoing description focuses on a ball screw assembly 16 wherein the wing member 12 is connected to the ball screw 20 and the aircraft control surface 14 is connected to the ball nut 22, those skilled in the art will appreciate that various alternative constructions may be used without departing from the scope of the present disclosure. For example, in one alternative construction, the wing member 12 may be connected to the ball nut 22 and the aircraft control surface 14 may be connected to the ball screw 20.

Referring back to FIG. 1, the PCU 18 may be any device capable of supplying a force that urges the ball nut 22 of the ball screw assembly 16 along the ball screw 20, thereby causing corresponding circumferential motion (i.e., actuation) of the aircraft control surface 14 relative to the wing member 12. The PCU 18 may be powered in various ways, including electrically (e.g., with an electric motor), hydraulically (e.g., hydraulic fluid moving a piston) or pneumatically (e.g., pressurized air moving a piston).

As shown in FIG. 1, the disclosed aircraft control surface actuation system 10 may include at least one PCU 18. Due to the use of the ball screw assembly 16, the PCU 18 may be positioned along the forward longitudinal edge of the aircraft control surface 14, and may be mounted coaxially with the axis A of the ball screw assembly 16, thereby reducing the overall space required for the PCU 18.

Figure 4:
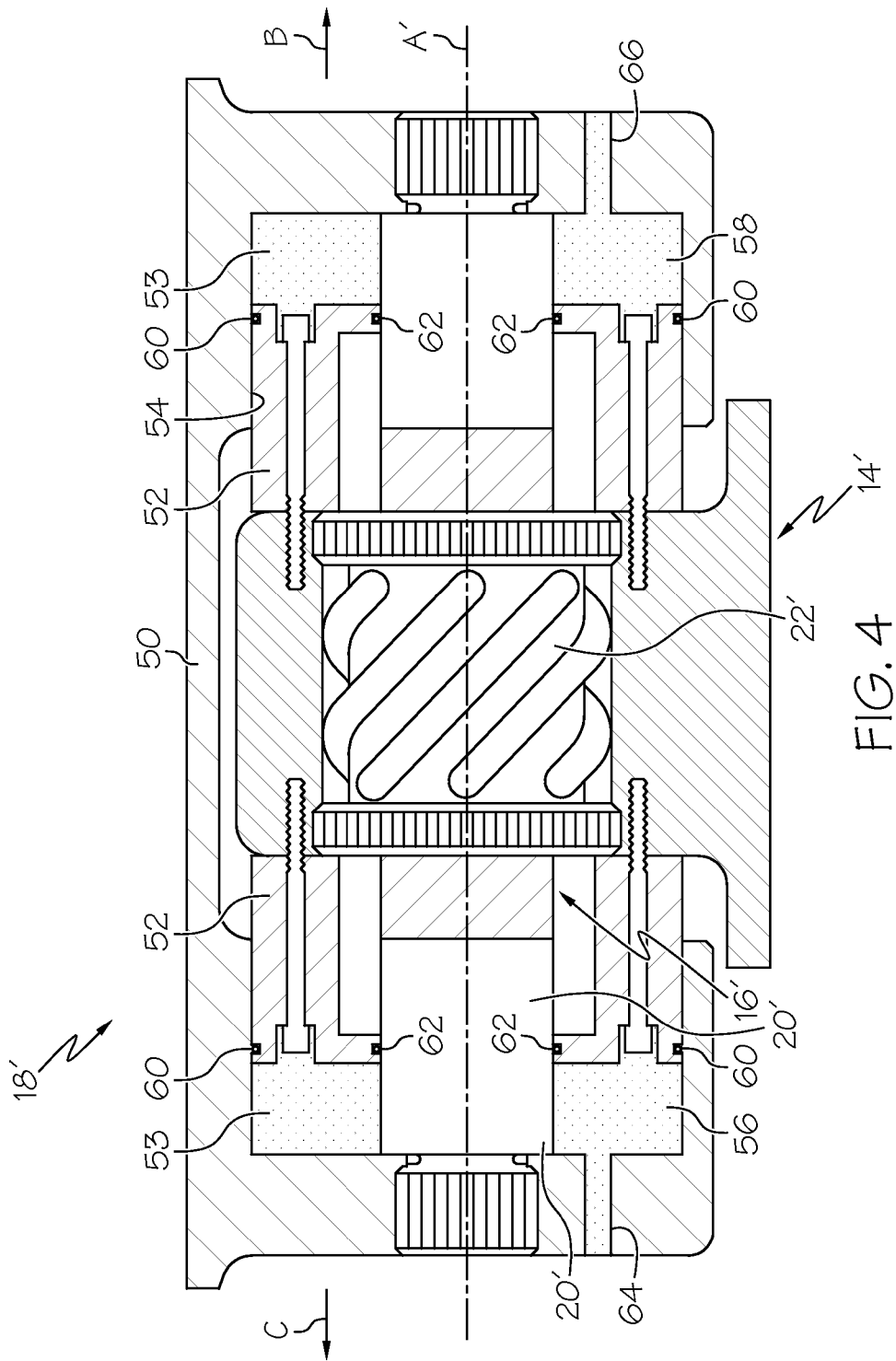
FIG. 4 is a side plan view, partially in section, of a power control unit of the disclosed aircraft control surface actuation system.

Referring to FIG. 4, in one particular embodiment, a hydraulic PCU 18' may be positioned over the ball screw assembly 16'. The PCU 18' may include a housing (or cylinder) 50 and a piston 52. The housing 50 may be connected to the rear spar of the wing member 12 (FIG. 1) and aircraft control surface 14' may be connected to the front spar of the aircraft control surface 14 (FIG. 1). Hydraulic fluid 53 within the housing 50 may be selectively pressurized or depressurized to urge the piston 52 and, thus, the ball nut 22' axially along the ball screw 20', thereby causing corresponding upward or downward movement of aircraft control surface 14' and the associated aircraft control surface 14 (FIG. 1). The hydraulic fluid pressure may be supplied from the aircraft's hydraulic system, from a local electrically-driven pump, or from a combination of the aircraft's hydraulic system and local electrically-driven pump.

The housing 50 may define a bore 54. The piston 52 may be closely and slidingly received within the bore 54 to define a first fluid chamber 56 and a second fluid chamber 58. Optional sealing members 60, such as O-rings, may ensure a fluid-tight seal between the piston 52 and the bore 54 as the piston 52 moves through the bore 54.

The piston 52 may be coaxially received over the ball screw 20' and may be connected to the ball nut 22'. The connection between the piston 52 and the ball nut 22' may be configured such that the ball nut 22' is permitted to rotate as it is axially urged along the ball screw 20' by the piston 52. Optional sealing members 62, such as O-rings, may ensure a fluid-tight seal between the piston 52 and the ball screw 20' as the piston 52 moves along the ball screw 20'.

A first fluid supply line 64 may be in fluid communication with the first fluid chamber 56 and a second fluid supply line 66 may be in fluid communication with the second fluid chamber 58. Therefore, the first fluid chamber 56 may be pressurized by introducing hydraulic fluid 53 to the first fluid chamber 56 by way of the first fluid supply line 64, thereby urging the piston 52 and associated ball nut 22' in the direction shown by arrow B. As the piston 52 moves in the direction of arrow B, a portion of the hydraulic fluid 53 in the second fluid chamber 58 may be displaced by way of the second fluid supply line 66. Likewise, the piston 52 and associated ball nut 22' may be urged in the direction shown by arrow C by introducing hydraulic fluid 53 to the second fluid chamber 58 while removing hydraulic fluid 53 from the first fluid chamber 56. Unlike a cylinder and bell crank PCU, PCU 18' may be fixed, and may not require flex hoses to accommodate motion relative to the wing spar.

Thus, the aircraft control surface 14' may be actuated to either the up or down configuration by controlling the hydraulic fluid 53 in the first and second fluid chambers 56, 58, thereby effecting axial movement of the piston 52 within the housing 50 such that the piston 52 supplies the desired axial force to the ball nut 22'.

In another embodiment (not shown), the PCU 18 may be configured without coaxially surrounding the associated ball screw assembly 16. For example, the PCU 18 may be configured as a hydraulic (or pneumatic) actuator having a piston rod axially extending therefrom. The piston rod may be operatively connected to the ball nut 22 such that selective pressurization of the actuator may cause corresponding extension or retraction of the piston rod, which in turn may cause corresponding axial movement of the ball nut 22 relative to the ball screw 20.

Thus, the disclosed aircraft control surface actuation system 10 may connect an aircraft control surface 14 to a wing member 12 using a ball screw assembly 16. During actuation, the aircraft control surface 14 may axially move along the axis A and, as such, may pivot either up or down. Therefore, each ball screw assembly 16 may apply torque to the aircraft control surface 14.

Accordingly the disclosed aircraft control surface actuation system 10 may allow for use of aircraft control surfaces 14 that are thinner and lighter because the aircraft control surfaces 14 of the disclosed aircraft control surface actuation system 10 do not require as much torsional stiffness as conventionally actuated aircraft control surfaces. The natural axial stiffness of the axially-actuated aircraft control surfaces 14 of the disclosed system 10 may supplant the need for torsional stiffness.

Other techniques, such as discussed below, may also be used to achieve helical motion of an aircraft control surface during actuation by an axial force. Such alternative techniques do not depart from the scope of the present disclosure.

Figure 5:
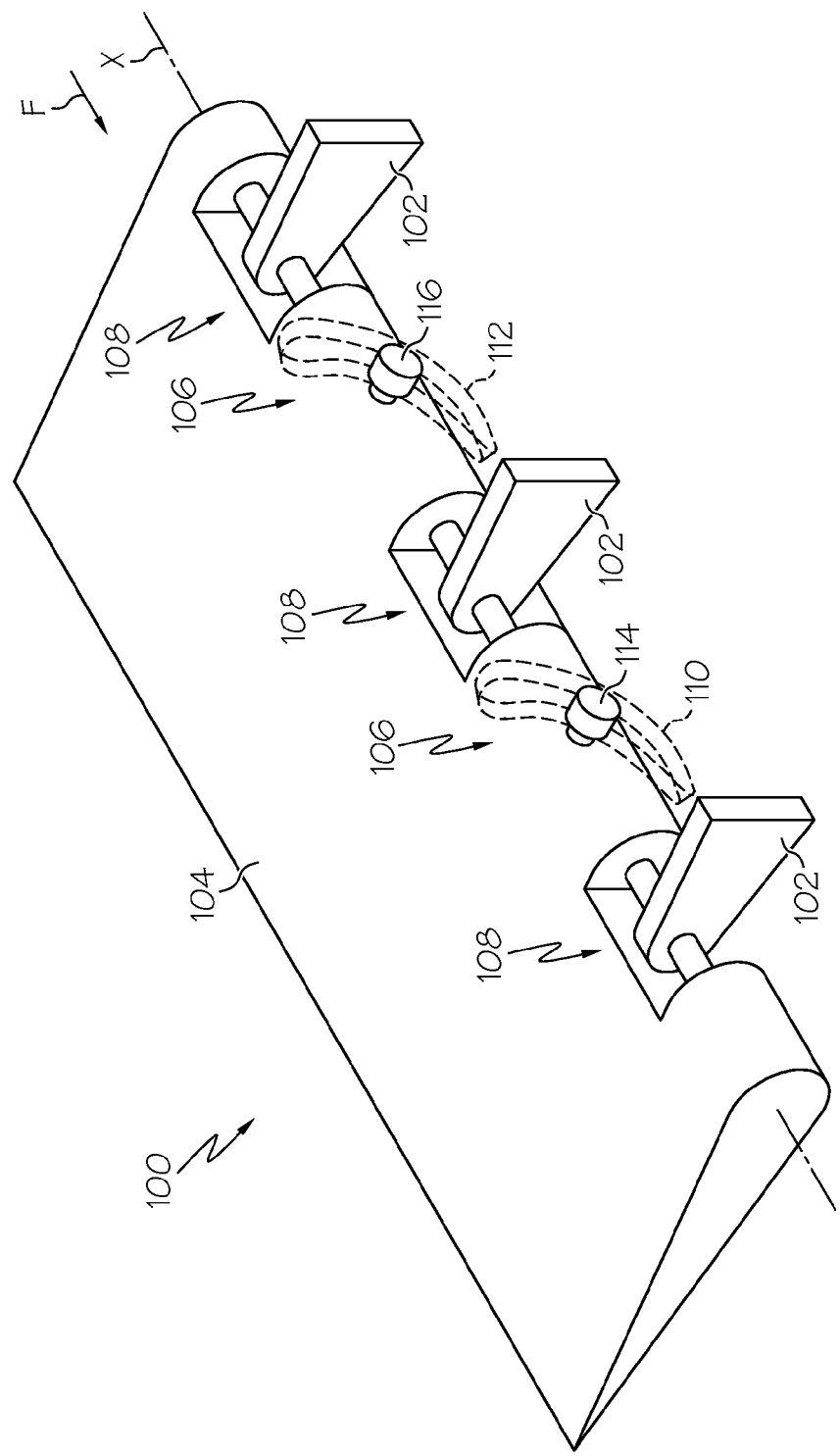
FIG. 5 is a perspective view of another aspect of the disclosed aircraft control surface actuation system, shown utilizing cam track slots and cam followers.

For example, referring to FIG. 5, another aspect of the disclosed aircraft control surface actuation system, generally designated 100, may include a wing member (only support brackets 102 extending from the rear spar of the wing member are shown), an aircraft control surface 104 and a cam assembly 106. The aircraft control surface 104 may be pivotally connected to the brackets 102 of the wing member by way of a journal bearing assembly 108 (three such journal bearing assemblies 108 are shown in FIG. 5). The journal bearing assemblies 108 may permit the aircraft control surface 104 to move relative to the wing member in an axial direction (i.e., along axis X) as well as in a circumferential direction (i.e., about the axis X).

The wing member may define cam track slots 110, 112. The cam track slots 110, 112 may extend in a slight helical path relative to the pivot axis X.

Cam followers 114, 116 may extend from the aircraft control surface 104. The cam followers 114, 116 may be in camming engagement with the cam track slots 110, 112, respectively. Therefore, as the aircraft control surface 104 pivots about the axis X relative to the wing member, the camming engagement between the cam followers 114, 116 and the cam track slots 110, 112, respectively, causes corresponding axial movement of the aircraft control surface 104 due to the helical path of the cam track slots 110, 112.

Thus, an axial force (arrow F) applied to the aircraft control surface 104 may be translated into corresponding up or down actuation of the aircraft control surface 104. The axial force (arrow F) may be applied to the aircraft control surface 104 using various mechanisms, including, but not limited to, using a pneumatic or hydraulic cylinder. For example, a pneumatic or hydraulic cylinder may be axially aligned with the aircraft control surface 104 and may be actuated such that a piston rod may extend from the cylinder and apply an axial force to the aircraft control surface 104.

Figure 6:
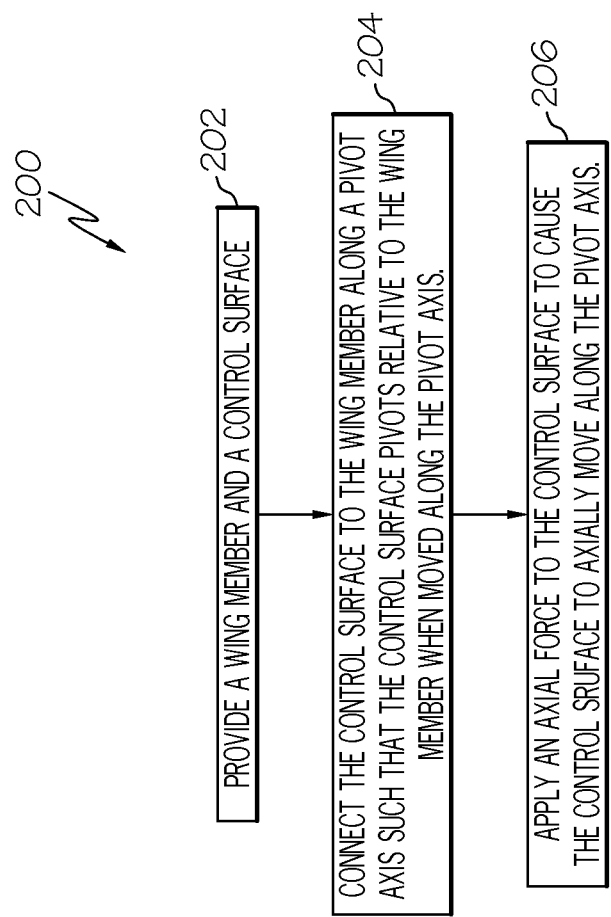
FIG. 6 is a flow chart depicting one embodiment of the disclosed method for actuating an aircraft control surface.

Also disclosed is a method for actuating an aircraft control surface. Referring to FIG. 6, one embodiment of the disclosed method for actuating an aircraft control surface, generally designated 200, may begin at block 202 by providing a wing member and an aircraft control surface.

As shown at block 204, the aircraft control surface may be connected to the wing member along a pivot axis such that the aircraft control surface may pivot about the pivot axis relative to the wing member when the aircraft control surface moves along the pivot axis. In a first implementation of the disclosed method 200, the connecting step (block 204) may include the step of connecting the aircraft control surface to the wing member using a ball screw assembly, as described in greater detail above and illustrated in FIG. 2. In a second implementation of the disclosed method 200, the connecting step (block 204) may include the step of connecting the aircraft control surface to the wing member using a cam assembly, as described in greater detail above and illustrated in FIG. 5.

Then, as shown at block 206, an axial force may be applied to the aircraft control surface to cause the aircraft control surface to axially move along the pivot axis. Therefore, the disclosed method 200 may effect pivotal movement of the aircraft control surface relative to the wing member by applying an axial force to the aircraft control surface. The applied axial force may cause both axial translation of the aircraft control surface along the pivot axis, as well as pivotal rotation of the aircraft control surface about the pivot axis.

Although specific embodiments have been illustrated and described herein, those of ordinary skill in the art appreciate that any arrangement which is calculated to achieve the same purpose may be substituted for the specific embodiments shown and that the embodiments herein have other applications in other environments. This application is intended to cover any adaptations or variations of the present disclosure. The following claims are in no way intended to limit the scope of the disclosure to the specific embodiments described herein.

What is claimed is:

1. An aircraft control surface actuation system comprising:
a wing member; and
an aircraft control surface pivotally connected to said wing member along a pivot axis,
wherein said aircraft control surface is configured to translate along said pivot axis relative to said wing member while simultaneously rotating about said pivot axis relative to said wing member.

2. The system of claim 1 further comprising at least one ball screw assembly between said wing member and said aircraft control surface.

3. The system of claim 2 wherein said ball screw assembly comprises a ball nut in threaded engagement with a ball screw.

4. The system of claim 3 wherein said wing member is connected to said ball nut and said aircraft control surface is connected to said ball screw.

5. The system of claim 1 further comprising at least one cam assembly between said wing member and said aircraft control surface.

6. The system of claim 5 wherein said cam assembly comprises a cam follower in camming engagement with a cam track slot, said cam track slot defining a helical path relative to said pivot axis.

7. The system of claim 6 wherein said wing member defines said cam track slot and said cam follower is connected to said aircraft control surface.

8. The system of claim 1 further comprising a power control unit configured to supply an axial force, said axial force causing said aircraft control surface to move relative to said wing member.

9. The system of claim 1 wherein said aircraft control surface is one of a flap, an aileron, an elevator, an elevon and a flaperon.

10. A method for actuating an aircraft control surface relative to a wing member, said method comprising the steps of:

connecting said aircraft control surface to said wing member along a pivot axis such that said aircraft control surface translate along said pivot axis while simultaneously rotating about said pivot axis; and applying an axial force to said aircraft control surface to cause said aircraft control surface to move relative to said wing member.

11. The method of claim 10 wherein said connecting step comprises connecting said aircraft control surface to said wing member at a ball screw assembly.

12. The method of claim 10 wherein said connecting step comprises connecting said aircraft control surface to said wing member at a cam assembly, said cam assembly comprising a cam track slot that defines a helical path relative to said pivot axis.

13. The system of claim 3 wherein said ball screw defines said pivot axis.

14. The system of claim 3 wherein said wing member is connected to said ball screw and said aircraft control surface is connected to said ball nut.

\* \* \* \* \*